April 11, 1950 W. P. MASON 2,503,400
TESTING TANK ARRANGED FOR SUPPRESSION
OF REFLECTED COMPRESSIONAL WAVES
Filed Oct. 6, 1943 3 Sheets-Sheet 2

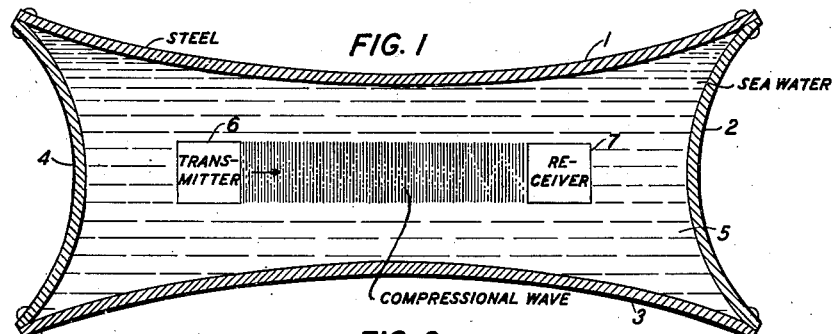
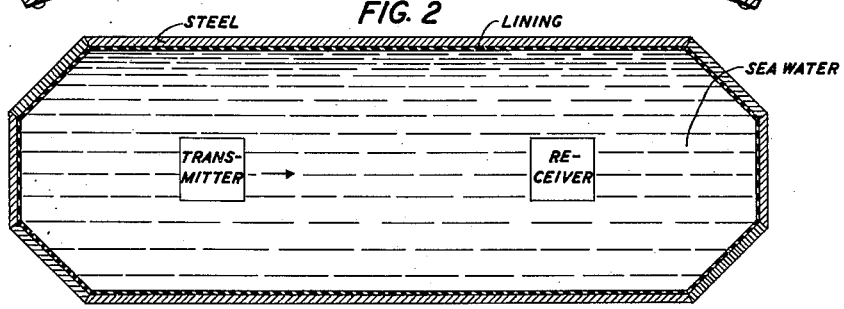
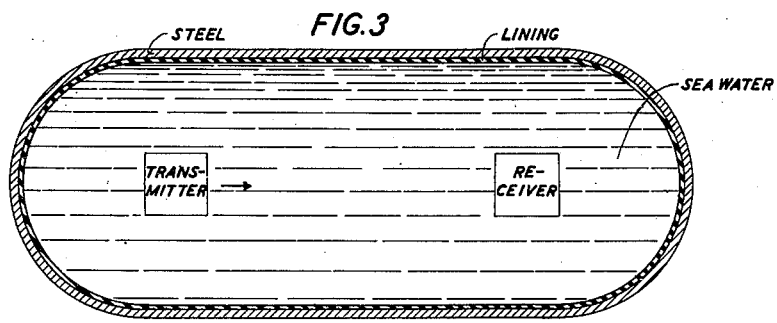
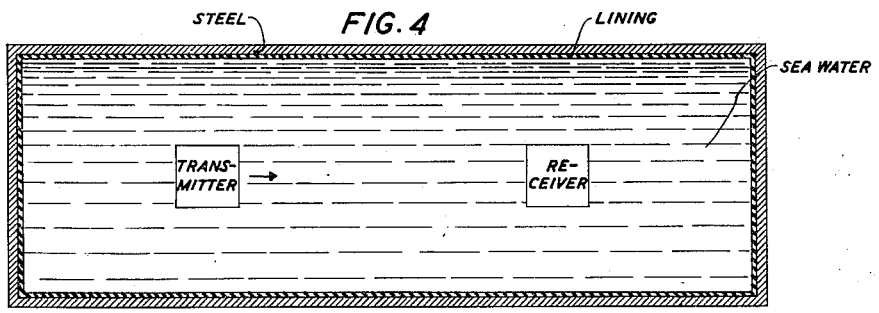

STEEL

COMPOSITION
HAVING LOW $\rho V$

LOADED SCREEN

WOVEN SCREEN
100 LINES
PER INCH

LEAD
WEIGHT

LEAD

INVENTOR
W. P. MASON
BY John C. Hall
ATTORNEY

April 11, 1950      W. P. MASON      2,503,400
TESTING TANK ARRANGED FOR SUPPRESSION
OF REFLECTED COMPRESSIONAL WAVES
Filed Oct. 6, 1943      3 Sheets-Sheet 3

INVENTOR
W. P. MASON
BY
ATTORNEY

Patented Apr. 11, 1950

2,503,400

UNITED STATES PATENT OFFICE 2,503,400

TESTING TANK ARRANGED FOR SUPPRESSION OF REFLECTED COMPRESSIONAL WAVES

Warren P. Mason, West Orange, N. J., assignor to Bell Telephone Laboratories, Incorporated, New York, N. Y., a corporation of New York Application October 6, 1943, Serial No. 505,157

7 Claims. (Cl. 181—0.5)

This invention relates to testing devices and particularly to enclosures or containers in which acoustic energy in the ultrasonic range is transmitted from point to point.

The object of the invention is to improve the construction of a measuring tank in which electromechanical transducers are placed under test in a manner to simulate the conditions found in an ocean of sea water of infinite extent. Stated differently, an object of the invention is to provide a construction wherein tests will not be rendered false and unreliable through the reflection of energy and in which only the energy intended to be directed to a receiving transducer will reach such device.

Electromechanical transducers intended for submarine working are generally designed for the ultrasonic range and testing facilities must be provided. It is impracticable to test such devices in sea water at a location where there will be no reflections and hence a container or tank must be provided for this purpose. Such tanks must be completely lined with absorbing material so that energy cannot be transmitted from a source and reach the receiving unit except over a direct route. The absorbing material or means must prevent reflections from the sides of the walls of the tank. Such absorbing material is best realized in the form of a combination of viscous liquid and layers of a fine mesh screen. Even so the steel walls of the tank may cause reflections which will direct a disturbing amount of energy back to the transducer under test. This is especially true where the tank is substantially oval in shape or has concave-shaped walls so that concentration of energy takes place. Even where the walls are flat but the general outline is concave this effect is found to provide a source of disturbance.

In accordance with the present invention the walls of a tank are so constructed that the reflections are dispersed rather than concentrated or treated in such manner that the reflections sum up to practically zero.

One feature of the invention is a tank constructed with walls of a convex contour whereby the reflections are scattered and dispersed.

Another feature of the invention is a tank whose inside surfaces are treated in such a manner that reflections from one portion thereof nullify the reflections from another portion thereof. In accordance with this feature the walls are divided into a regular pattern of small areas differing in texture from each other whereby the reflections from part of these small areas are caused to be out of phase with the reflections from the remainder. As a specific example the walls are treated in a checkerboard design with small areas of a compound of acoustically reflecting material. Further, in accordance with this feature the walls are treated in a checkerboard design with some areas having a greater impedance than the liquid which the walls contain and other areas having a lesser impedance than the said liquid. Accordingly, and as controlled by the reflection factor, the reflections from these differing areas will be substantially 180 degrees apart and will therefore nullify each other.

Another feature of the invention is a surface at which no reflection of compressional waves of ultrasonic frequency will take place. Still another feature of the invention is a method of rendering a submerged body substantially "invisible" to range finding and submarine detecting devices working at ultrasonic frequencies.

In accordance with another feature of the invention an absorbing means is constructed of a combination of viscous liquid and massive screen. As one specific example of massive screen comprises a screen loaded with regularly disposed weights placed thereon in a checkerboard design.

Other features will appear hereinafter.

The drawings consist of three sheets having twelve figures, as follows:

Fig. 1 is an outline, substantially a horizontal cross-sectional view of one form of measuring tank in which concentration of reflected waves is prevented by the contour of the walls;

Fig. 2 is a similar view of a tank having flat walls but being generally octagonal in outline;

Fig. 3 is a similar view of a tank having flat side walls and semi-circular ends;

Fig. 4 is a similar view of a tank having a simple rectangular outline;

The best way of making a measuring tank if no absorption is available is indicated in Fig. 1. Here the four pieces of sheet steel 1, 2, 3 and 4 are rolled to present convex surfaces toward the inside of the tank. They may be secured at the corners in any convenient manner as by riveting or welding. The bottom of the tank should also be formed to present a convex surface toward the interior. The tank is then filled with water, which may be either fresh water or sea water and a pair of transducers 6 and 7 immersed therein, one acting as a transmitter and the other as a receiver. Where receivers are to be measured a transmitter of known capabilities is employed and where transmitters are to be measured a receiver of known capabilities is employed. With this type of construction and due to the convex surfaces of the walls the reflection of the compressional waves from the walls is scattered and therefore the errors due to reflections are minimized. However, even with the shape reflections are appreciable, so other means to prevent reflections from the side and bottom walls must be found.

Figs. 2, 3 and 4 show other possible practical constructional forms. Fig. 3 shows the preferred form, one in which the ends are semi-circular. This form, however, acts to concentrate reflected waves at about the points where the transducers are located. The construction shown in Fig. 2 also concentrates the reflections at the locations of the transducers but not to such a high degree as the form of Fig. 3. The simple rectangular form of Fig. 4 is practical but like the form of Fig. 2 presents certain practical difficulties in construction, so that as above stated the form of Fig. 3 is preferred although it does present the most perfect concave concentrating surfaces.

Applicant has found that reflections may be practically nullified by lining the inside surfaces of the walls of the tank with a layer of reflecting material such as ground cork embodied in a binder of rubber or other similar plastic material. This material is cut in a checkerboard pattern so that alternate surfaces are exposed surfaces of the bare steel walls. If the design is made so that the surface is one-half bare steel and the other half is lined with this reflecting material, then due to the fact that the impedance of the steel is higher than that of water, while the impedance of this lining material is lower, the waves reflected from these two differing surfaces are 180 degrees out of phase and the reflections are practically and substantially nullified.

Figure 5:
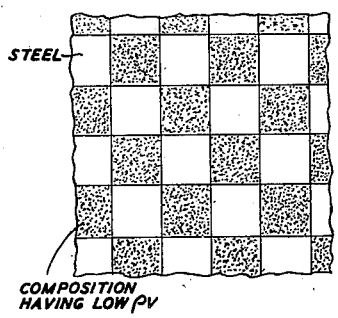
Fig. 5 is a checkerboard design into which a lining for the walls of a tank may be cut.
Figure 6:
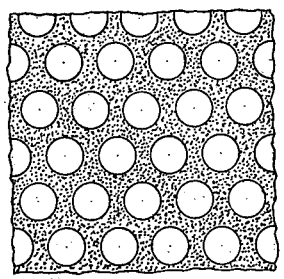
Fig. 6 is an alternative design in which round holes are cut, the dimensions of which are such that the area of material left is equal to the area of the material cut away.
Figure 7:
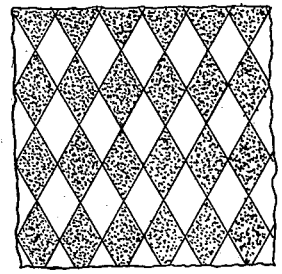
Fig. 7 is an alternative design in a diamond-shaped pattern.

Fig. 5 shows one form in which the lining material may be cut, a plain rectangular checkerboard pattern. Fig. 6 shows a form in which circular holes are cut, these being regularly spaced and of such dimensions that the two areas of material and of bare surface will be equally divided. Fig. 7 shows a diamond-shaped design. Other forms may be used according to other considerations such as the practical facilities for cutting and affixing to the walls may dictate.

The lining material is in thin sheets of 40 to 80 mils thickness. Since the steel of the tank walls has a high impedance with respect to the liquid in the tank and the lining has a very low impedance with respect to the liquid the reflections from these two different kinds of surface will be approximately 180 degrees apart. In general, the effect of the lining is to scatter energy more or less uniformly throughout the volume of the tank and hence will approximate the effect of the shape of the tank of Fig. 1. A submerged body covered with a lining of this nature will be substantially "invisible" to range finding and locating devices working in the ultrasonic range due to the substantial absence of reflection therefrom.

As the frequency becomes greater, the effect of the lining will be to change from a uniform scattering to concentrating the energy in definite directions as does a diffraction grating. For example, let us suppose the checkerboard design of Fig. 5 is used and that each square is one centimeter on a side. From a flat surface the center of the reflection from the lined surfaces will concentrate the reflected beams along an angle $\theta$ given by $$d \sin \theta = n\lambda$$

where $\lambda$ is the wavelength of the incident wave and $n$ is an integer. Hence, if the center separation is 2 centimeters and the frequency is 100 kilocycles, so that the wavelength is 1.5 centimeters, the energy will be concentrated with the first order spectrum at an angle of $$\sin \theta = \frac{1.5}{2} = .75 \qquad \theta = 48°40'$$

The bare wall spaces in between will also concentrate their energy in the same direction, but since the path length after reflection will be only a half wavelength from the reflection point to the wave front and since this reflection is 180 degrees out of phase with the reflection from the lined portions, the result is the combination of both waves to produce concentration in one direction. However, this concentration will only occur at the higher frequencies. It will not occur if the separation of the centers is equal to or less than the shorter wavelengths of interest. For the example above cited where the separation centers is 2 centimeters the checkerboard will diffuse the energy in all directions up to a frequency of 75 kilocycles, which being the practical upper limit at which some tanks are used, will be satisfactory. Operation at still higher frequencies will require the checkerboard to be made of smaller and smaller squares.

Figure 8:
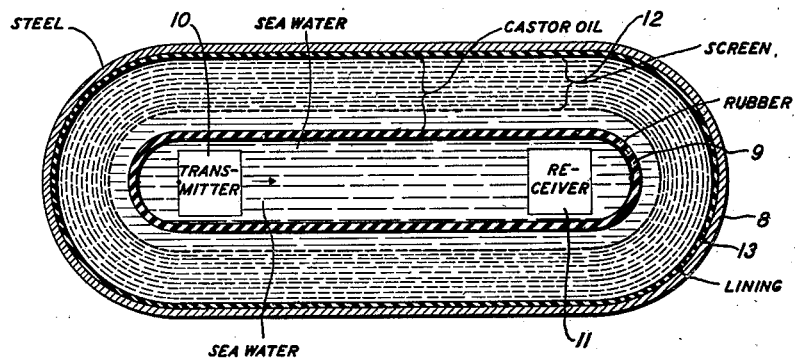
Fig. 8 is a view similar to Figs. 1, 2, 3 and 4 showing the tank as generally constructed in which the walls are lined, an absorbing layer of fine mesh screen in oil is used, and a barrier is used to separate the oil from the water in which the testing apparatus is immersed.

The complete construction of a measuring tank useful over a range of 10 to 100 kilocycles is shown in Fig. 8. Here there is the steel body 8 with a similarly shaped body 9 centrally disposed in which the transmitter 10 and receiver 11 are placed. This element 9 is constructed of a sound transparent plastic such as pure gum rubber, any one of the commercial types of rubber such as the well-known ρc rubber or other material having transmission characteristics equal to that of water. The enclosure 9 contains water and the space outside is filled with castor oil or some other liquid having the same transmission characteristics as water. Between the outer surface of the element 9 and the inner surface of the tank are placed a large number of fine meshed screens 12 which in combination with the viscous liquid act as an absorbing medium. The absorbing effect is due to the energy loss in moving the viscous oil through the small openings of the screen. The spacing between screens is determined by the lowest frequency of interest and the permissible reflection factor.

The construction of screens in oil can be considered a "T" network having series arms $$Z_1 = R_1 + j\omega(M_1 + M_2) = \frac{8\mu l}{Sr^2} + j\omega\rho\left(L + \frac{4l}{3S}\right)$$

and shunt arms $$Z_2 = \frac{-j}{\omega C_2} = -j\frac{\rho v^2}{\omega L}$$

where $l=$ thickness of the screen
$S=$ effective opening of a screen of 1 cm.$^2$
$\mu=$ viscosity of the oil
$r=$ effective radius of the screen holes
$\rho=$ density of the oil
$v=$ velocity of sound in the oil
$L=$ separation between screens
$\omega = 2\pi f$ ($f=$ frequency in cycles per second)

For the absorbing medium to work adjacent to water down to about 10 kilocycles and in order to reduce the reflection factor to a low value, the attenuation per unit length should not be too high. This can be expressed as $$A = \frac{4\mu l}{r^2 S\rho vL}\sqrt{\frac{L}{L + \frac{4l}{3S}}} \leq \frac{1.257f}{v}$$

or $A \leq .0835$ neper per centimeter at 10 kilocycles.

This condition may be approximated by having absorbing walls about 5 inches in thickness. These consist of seven screens per inch in air-free castor oil using copper wool of proper thickness as spacers. The screens are of 100-mesh wire of .004 inch thickness.

The inner wall 9 is covered with a layer 13 of absorbing material cut out as shown in Figs. 5, 6 or 7 properly proportioned with respect to the upper limit of the frequencies to be used.

The measuring tank above described by way of example produces useful results from 10 kilocycles up to any higher frequency but below 10 kilocycles the absorbing wall ceases to function well and reflections are no longer held to a low value. The reason for this is that the screen material and associated liquid load do not have enough mass to keep the screen stationary. As a result the screen moves with the oil vibration much as a flag waves in the breeze and as a consequence no damping is put in by the viscous oil screen system.

Figure 9:
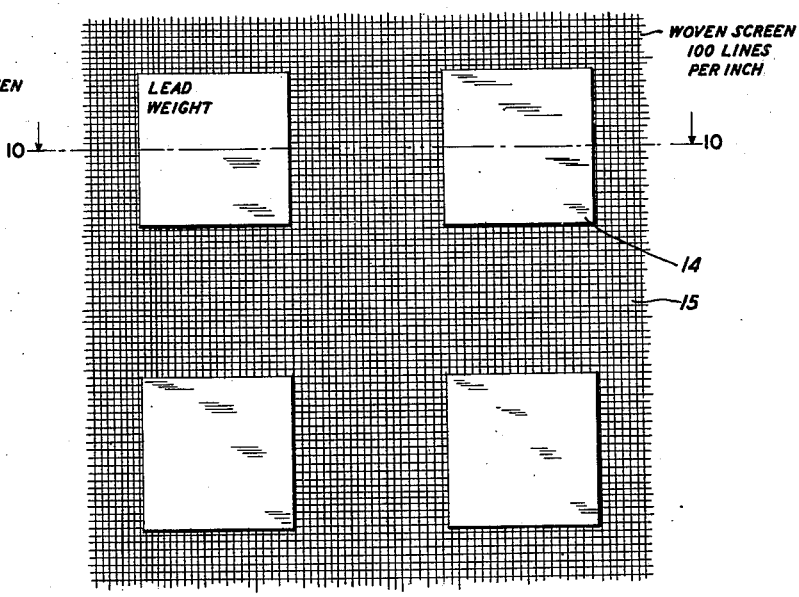
Fig. 9 is a view, greatly enlarged of a fine mesh screen into which lead blocks are molded at regular intervals for providing one practical form of massive screen.
Figure 10:
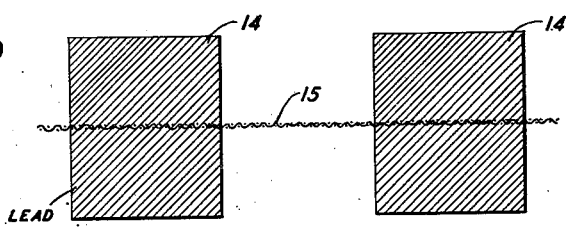
Fig. 10 is a cross-sectional view of the same.

This defect may be overcome by using a massive screen. While it is theoretically possible to construct screens of more massive materials the better practical method is to load the screen with a number of lead weights as indicated in Fig. 9. This can be done by molding the weights 14 around and through the screen 15 which will give a solid connection to the screen, whereby the total mass of the screen can be very materially increased.

The question arises as to how close the lead weights will have to be placed together before they can be considered as a constant loading superposed on the weight of the screen. If they are too far apart all the lead weight points will remain stationary but the screen in between would vibrate in the manner of a clamped diaphragm and would be only slightly effective in making the oil pass through the screen. It is more desirable in such a case to use a stiffer screen with a smaller number of meshes per inch and a more viscous liquid to get the same resistance per unit area. Such a liquid can be obtained by mixing blown castor oil, which has a high viscosity (around 100 poises) with db castor oil in any desired proportions. In this way the viscosity of the combination can be adjusted to any desired value.

Figure 11:
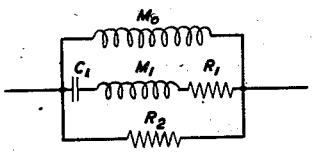
Fig. 11 is a circuit diagram showing the electrical equivalent of the loaded screen and through which calculations of the size and spacing of the lead weights can be made.

The approximate equivalent circuit of the combination is as shown in Fig. 11 where $M_0$ is the mass of the weights, screen and oil pulled along by the screen, $C_1$, $M_1$ and $R_1$ are the stiffness, effective mass and resistance of the screen considered as a clamped diaphragm, and $R_2$ is the resistance of the screen if its is held stationary and the oil is swished through it. Hence to be effective, we have to make the resonant frequency of the screen systems between molded weights high and the compliance $C_1$ small. The resonant frequency has to be raised up to the point that the screen system without weights will work properly. An indication of how high the frequency and hence how close the weights have to be spaced is given by considering the screen a solid piece of metal the same thickness as the screen with an effective radius half the distance between weighted points. It is known that the resonant frequency of a thin plate clamped on the edges is given by the formula $$f = \frac{.474 l_t}{a^2}\sqrt{\frac{Y_0}{\rho(1-\sigma^2)}}$$

where $l_t$ is the plate thickness
$a$ is the radius
$Y_0$ is Young's modulus
$\rho$ is the density, and
$\sigma$ is the Poisson ratio For a steel plate $Y_0 = 2 \times 10^{12}$, $\rho = 7.9$, and $\sigma = .3$. Hence for a disc 4 mils thick, with a radius of .5 centimeter the frequency is 10,000 cycles. This is about the frequency at which the screen alone will have enough mass. On the other hand this calculation probably gives too high a value so it is desirable to improve the stiffness of the wire and the viscosity of the oil.

As an example, if we space the lead weights 1 centimeter apart and make them .5 centimeter on a side the mass of the lead weight per square centimeter should be 1.42 grams. The mass of the screen is .07 gram and the mass of the oil dragged along by the screen has been evaluated at about .28 gram per square centimeter giving a total weight of 1.77 grams per square centimeter. The reactance of the loaded screen will equal this resistance at 1600 cycles. By making the lead loading twice as thick (1 centimeter) the reactance would equal the resistance at 875 cycles. Hence, for 1000 cycles up a uniform attenuation with frequency would be obtained. Using such loaded meshes spaced at a separation of 1.2 centimeters, a wall of 24 centimeters (20 loaded screens) would provide a loss of 10 decibels and would result in a usable measuring tank from a low frequency of 1000 cycles.

Figure 12:
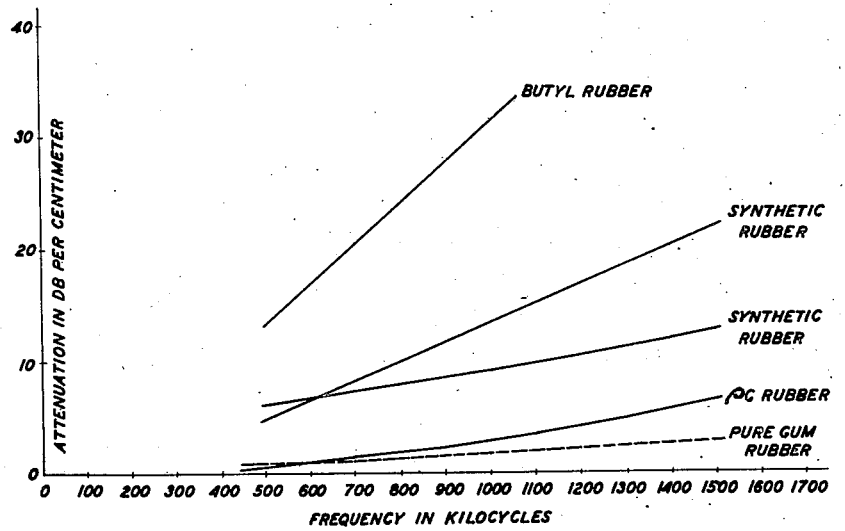
Fig. 12 is a set of graphs showing the values of attenuation with respect to frequency which various forms of rubber will give.

Going to the other extreme and considering means for constructing a measuring tank at very high frequencies, say above 100 kilocycles to 1500 kilocycles it may be sufficient to line the tank with an absorbing material having a high attenuation at the frequency of interest. Thus, measurements of the propagation characteristics of certain rubbers show the values depicted in the graphs of Fig. 12. The synthetic rubber there noted as butyl rubber has a very high attenuation at frequencies above 400 kilocycles and since this as well as the other rubbers depicted all have an excellent impedance match to water, it appears that a tank constructed in accordance with Fig. 8 with the barrier 9 constructed of this material would provide a tank suitable for high frequencies. Should it be desired to use the tank only for high frequency measurements a simple construction using a tank lined with this material alone would be sufficient, the thickness of the said lining being governed by the attenuation desired. By way of example, a lining of an eighth of an inch (about ⅓ of a centimeter) of butyl rubber will give an attenuation of 10 decibels at 1000 kilocycles, and a lining of a full centimeter will give an attenuation of 30 decibels.

It would be noted that the material usually employed as the barrier 9 and as diaphragms of hydrophones is that commercial grade of rubber known as $\rho c$ rubber. Where the lowest attenuation possible is desired the pure gum rubber is superior to the $\rho c$ rubber at frequencies above 500 kilocycles and since this has almost exactly the same transmission characteristics as water, it may be used in the high frequency apparatus.

It will be noted that by the proper selection of the various factors hereinabove described that a measuring tank suitable for use at any given frequency or in any given frequency range may be constructed.

What is claimed is:

1. In a testing device, a tank for holding a medium for the transmission of waves between a source of ultrasonic compressional waves and a transducer responsive to said waves immersed in said medium, and means for preventing concentration of waves reflected from the walls of said tank in the vicinity of said transducer, said means including the combination of a viscous liquid and weighted fine mesh screen between the walls thereof and the points of location of said devices for absorbing waves.

2. In a testing device, a tank for holding a medium for the transmission of waves between a source of ultrasonic compressional waves and a transducer responsive to said waves immersed in said medium, and means for preventing concentration of waves reflected from the walls of said tank in the vicinity of said transducer, said means including the combination of a viscous liquid and fine mesh screen having weights attached thereto in a regular pattern between the walls of said tank and the points of location of said devices for absorbing waves.

3. In a testing device, a tank, a medium in said tank for the transmission of waves, a source of ultrasonic compressional waves and a transducer responsive to said waves immersed in said medium with a clear and direct path through said medium between said source and said transducer and means in said tank for preventing concentration in the vicinity of said transducer of waves reflected from the walls of said tank, said last means including wall surfaces shaped to reflect waves from said source mainly away from said transducer and wave attenuating devices in the paths of all waves reflected from the walls of said tank.

4. In a testing device, a tank, a medium in said tank for the transmission of waves, a source of ultrasonic compressional waves and a transducer responsive to said waves immersed in said medium with a clear and direct path through said medium between said source and said transducer and means in said tank for preventing concentration in the vicinity of said transducer of waves reflected from the walls of said tank, said last means including wall surfaces shaped to reflect waves from said source mainly away from said transducer and wave attenuating devices in the paths of all waves reflected from the walls of said tank, said attenuating devices including a plurality of layers of fine mesh screen immersed in said medium.

5. In a testing device, a tank, a medium in said tank for the transmission of waves, a source of ultrasonic compressional waves and a transducer responsive to said waves immersed in said medium with a clear and direct path through said medium between said source and said transducer and means in said tank for preventing concentration in the vicinity of said transducer of waves reflected from the walls of said tank, said last means including wall surfaces shaped to reflect waves from said source mainly away from said transducer and wave attenuating devices in the paths of all waves reflected from the walls of said tank, said attenuating devices including a plurality of layers of massive fine mesh screen immersed in said medium.

6. In a testing device, a tank, a medium in said tank for the transmission of waves, a source of ultrasonic compressional waves and a transducer responsive to said waves immersed in said medium with a clear and direct path through said medium between said source and said transducer and means in said tank for preventing concentration in the vicinity of said transducer of waves reflected from the walls of said tank, said last means including wall surfaces shaped to reflect waves from said source mainly away from said transducer and wave attenuating devices in the paths of all waves reflected from the walls of said tank, said attenuating devices including a wall surface covering of absorbing material affixed to said walls in a regular pattern of covered and uncovered area.

7. In a testing device, a tank, a medium in said tank for the transmission of waves, a source of ultrasonic compressional waves and a transducer responsive to said waves immersed in said medium with a clear and direct path through said medium between said source and said transducer and means in said tank for preventing concentration in the vicinity of said transducer of waves reflected from the walls of said tank, said last means including wall surfaces shaped to reflect waves from said source mainly away from said transducer and wave attenuating devices in the paths of all waves reflected from the walls of said tank, said attenuating devices including a wall surface covering of absorbing material affixed to said walls in a regular pattern of covered and uncovered areas, said covered areas having an impedance less than the impedance of said medium by an amount substantially equal to the amount by which the impedance of the uncovered areas exceeds the impedance of said medium.

WARREN P. MASON.

REFERENCES CITED

The following references are of record in the file of this patent:

UNITED STATES PATENTS

| Number | Name | Date |
|---|---|---|
| 1,309,728 | Grieshaber | July 15, 1919 |
| 1,355,598 | Fessenden | Oct. 12, 1920 |
| 1,481,923 | Nash | Jan. 29, 1924 |
| 1,529,520 | Watkins | Mar. 10, 1925 |
| 1,635,787 | Hort | July 12, 1927 |
| 1,687,308 | Paradise | Oct. 9, 1928 |
| 1,838,645 | Voigt | Dec. 29, 1931 |
| 2,000,806 | White | May 7, 1935 |
| 2,105,365 | Pancotti | Jan. 11, 1938 |
| 2,263,902 | Percival | Nov. 25, 1941 |
| 2,294,125 | Niedermeier | Aug. 25, 1942 |
| 2,313,379 | Wood | Mar. 9, 1943 |
| 2,318,417 | Phelps | May 4, 1943 |